United States Patent [19]

Nussbaum et al.

[11] Patent Number: 5,602,801
[45] Date of Patent: Feb. 11, 1997

[54] UNDERWATER VEHICLE SONAR SYSTEM WITH EXTENDIBLE ARRAY

[75] Inventors: Fred Nussbaum, Middletown; Charles H. Beauchamp, Jamestown, both of R.I.

[73] Assignee: The United States of America as represented by the Secretary of the Navy, Washington, D.C.

[21] Appl. No.: 530,462

[22] Filed: Dec. 6, 1995

[51] Int. Cl.$^6$ .................................................. H04R 17/00
[52] U.S. Cl. .......................... 367/165; 367/173; 367/129; 367/153; 114/21.3
[58] Field of Search .................................... 367/165, 173, 367/4, 153, 129, 88, 106, 130, 154; 114/21.3

[56] References Cited

U.S. PATENT DOCUMENTS 5,363,343  11/1994  Klein ...................................... 367/165

*Primary Examiner*—Daniel T. Pihulic
*Attorney, Agent, or Firm*—Michael J. McGowan; William F. Eipert; Prithvi C. Lall

[57] ABSTRACT

An underwater vehicle sonar system has sonar sensors provided in arms to supplement a nose mounted array. The arms are capable of use in an extended position to provide a large diameter sonar array offering improved image resolution in the forward direction. In the extended position the arms also are capable of acting as active hydrodynamic control surfaces. Additionally, the arms can be used in a stowed position to provide a linear array for side viewing.

10 Claims, 1 Drawing Sheet

U.S. Patent   Feb. 11, 1997   5,602,801
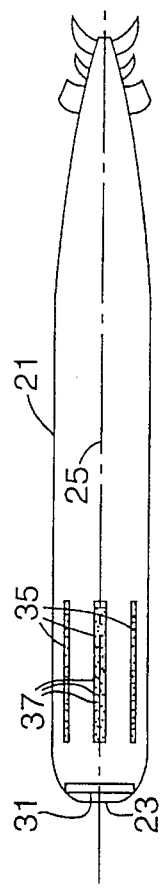
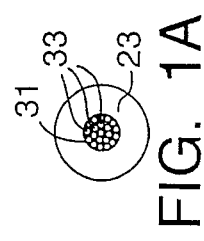
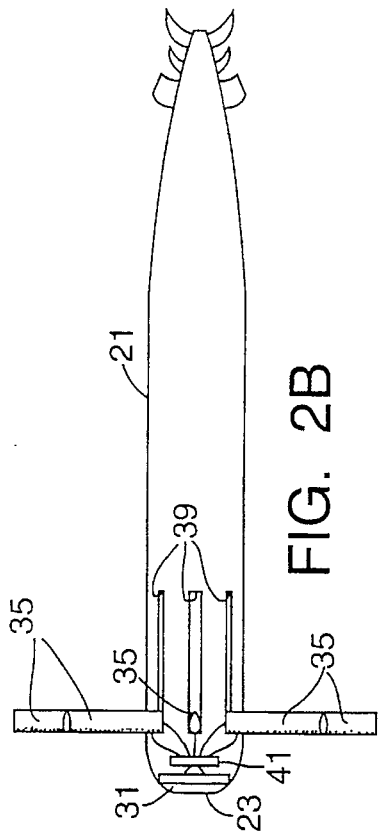
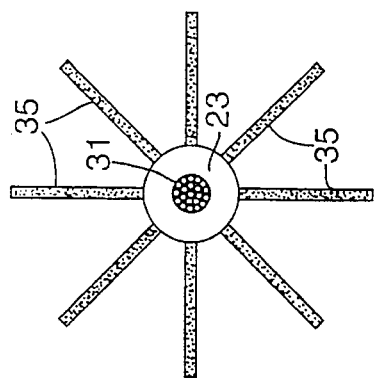
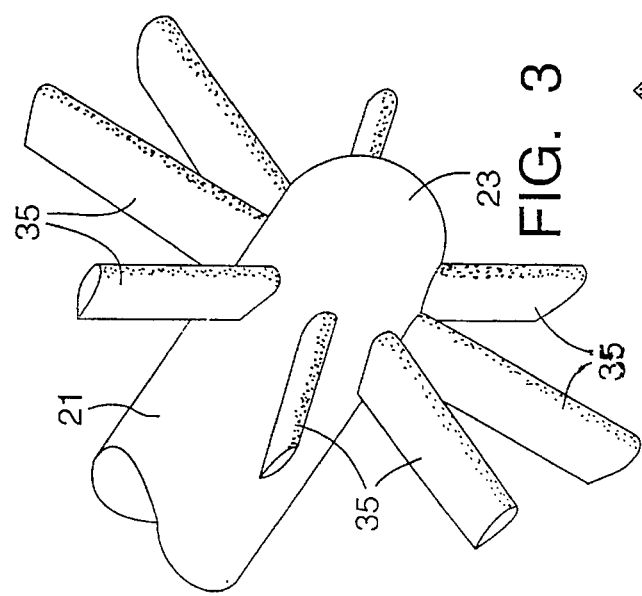

UNDERWATER VEHICLE SONAR SYSTEM WITH EXTENDIBLE ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to unmanned underwater vehicles adapted to travel at either high or low speed below the surface of the sea. More specifically the invention relates to providing such a vehicle with an extendible sonar array which has a forward looking capability that supplements the provision of a conventional nose mounted array in such a vehicle.

(2) Description of the Prior Art

Underwater vehicles have in the past been provided with nose mounted sonar arrays which are capable of looking forward but which forward ranging is relatively restricted due to the small overall diameter of such underwater vehicles in general.

Larger arrays have been limited to use on vertically extending cables, and although some versions of such larger diameter arrays have been designed that provide for deployment motion of the hydroplane transducers relative to the vertically oriented cable, such a feature has never been applied to high speed unmanned underwater vehicles (UUV). Scopatz U.S. Pat. No. 3,566,346, Jonkey U.S. Pat. No. 3,886,491 and Secretan U.S. Pat. No. 5,091,892 illustrate such cable mounted sonar arrays.

Also known from the prior art is the fact that control fins or stub wings have been designed to be extendible and retractable from a position parallel to the longitudinal axis of a vehicle and to extended positions where the axis of the fin or wing is oriented transversely to the vehicle axis. See for example U.S. Pat. No. 4,667,899 issued to Wedertz.

The above described disclosures do not show or suggest a system for providing an array of sonar devices that can be used in stowed positions in cavities at the sides of the generally cylindrical body portion of an unmanned underwater vehicle and in extended positions where the sonar devices provide a relatively large diameter array suitable for improved image resolution, and also capable, as a result of this increased diameter, for wider band operation generally. Underwater vehicles generally must be capable of being launched from a conventional submarine torpedo tube and therefore such external arrays have not been utilized due to the size limitations inherent from the torpedo tube diameter itself. Also the fact that external arrays generally impose a severe drag penalty on the operation of a typical underwater vehicle and, when located near the nose of the vehicle, tend to greatly reduce the stability of the vehicle has inhibited the development of such a concept.

SUMMARY OF THE INVENTION

It is the general purpose and object of the present invention to provide an extendible array for a relatively high speed unmanned underwater vehicle of the type adapted to be launched from a torpedo tube. The array can be operated in a stowed position such that the sonar sensors provide for side viewing relating to the vehicle itself when in the stowed configuration. The array of sonar sensors is also movable to an extended position wherein the sensors are in positions at a relatively large radius from the longitudinal axis of the vehicle. As deployed the sensors are thereby capable of cooperating with a nose mounted array so as to improve the operational capabilities of the overall system generally.

These and other objects are accomplished with the present invention by providing an underwater vehicle with a conventional nose mounted sonar array, and by providing longitudinally extending cavities in the generally cylindrical body portion of the vehicle aft of this nose portion. These cavities are circumaxially spaced around the longitudinal axis of the unmanned underwater vehicle, and arms are stowed in these cavities. The arms are moveable from their stowed position to extended positions wherein they define a radial plane substantially perpendicular to the axis of the underwater vehicle. Sonar sensors are provided at least adjacent the end portions of these arms so as to be operable in conjunction with the nose mounted sonar array for improving the long range characteristics of an otherwise conventional nose mounted sonar system.

Operation of the sonar sensors at the tips of the arms in their stowed positions also provide a side viewing mode of operation. Further, the arms are preferably movable on individual radial axes, and are so shaped as to provide for increased stability of the vehicle when it is traveling at relatively slow speeds with the arms in their extended positions. Higher resolution of the sonar system is made possible by the larger diameter of such a sonar array in this extended position.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1A shows an unmanned underwater vehicle in a front elevational view;

FIG. 1B shows the vehicle of FIG. 1A in a side elevational view;

FIG. 2A shows the vehicle of FIG. 1A with arms in the present invention in extended positions;

FIG. 2B shows the vehicle of FIG. 2A in a side elevation similar to that of FIG. 1B but again with the arms in their extended positions; and FIG. 3 is a perspective view showing the overall configuration of an unmanned underwater vehicle nose portion and associated body portion with arms of the present invention configured to act as stabilizing fins.

DESCRIPTION OF THE PREFERRED EMBODIMENT

FIGS. 1A and 1B illustrate in somewhat schematic fashion an unmanned underwater vehicle (UUV) having a generally cylindrical body portion 21, a nose portion 23 and defining a generally symmetrically longitudinal axis 25 which is oriented parallel to the direction of travel of the vehicle. Such vehicles are capable of relatively high speed travel in the underwater environment, and capable of being launched from a conventional submarine torpedo tube. This capability does restrict the overall diameter of the vehicle itself, however, to that of a conventional torpedo, and thereby dictates or limits the use of sonar systems in such vehicles to a nose mounted array as suggested generally at 31 in FIGS. 1A and 1B. Although a plurality of sonar sensors 33,33 are generally provided in the nose mounted array 31, the overall diameter of the nose mounted array 31 provides a forward looking sonar of limited image resolution due to the overall diameter of such a nose mounted array.

tin accordance with the present invention further sonar sensors 37 are provided in arms 35,35. It will be apparent as a result of comparing FIGS. 1A and 1B with FIGS. 2A and 2B that each of the arms 35,35 can be moved from a stowed position (shown in FIGS. 1A and 1B) wherein the arms are generally parallel to the longitudinal axis 25 of the UUV to an extended position (shown in FIGS. 2A and 2B) wherein the arms generally define a radial plane oriented substantially perpendicular to the longitudinal axis 25 of the UUV. In the stowed position, the arms 35,35 are preferably contained in cavities, indicated generally at 39 in FIG. 2B, in the cylindrical body portion of the underwater vehicle. The cavities extend longitudinally, in the direction of travel, in the sides of the UUV and are spaced, preferably at equal distances, around the circumference of the generally cylindrical body 25 of the UUV. Preferably the arms 35,35 and cavities 39 are defined such that when the arms are in their stowed position the arms generally conform to the contour of the cylindrical body portion of the underwater vehicle.

The sensors 33 of nose mounted array 31 and the sensors 37 provided in arms 35,35 generate sensor sonar signals (not shown) in response to acoustic energy received. As suggested in FIG. 2B an array signal processor 41 is connected to both the nose mounted array 31 and the sensors 37 provided in the arms 35 to process these sensor signals. When the arms are in the extended position, signal processor 41 can process the sensor signals generated by array 31 along with the signals generated by sensors 37, particularly those provided at a relatively large radius from the center line of the vehicle, as signals from a single large diameter array, thereby providing high resolution images. It is readily apparent that the resulting forward looking array provides for improved image resolution well beyond that possible of a conventional forward looking array of the type normally provided in the nose portion of the underwater vehicle.

It should be readily apparent that the underwater vehicle need not have its hydrodynamic performance impeded as a result of this capability because the arms 35,35 can be retracted from the position shown in FIGS. 2A and 2B to that shown in FIGS. 1A and 1B to reduce drag during high speed travel. Additionally, with the arms 35,35 in the stowed position, array signal processor 41 can process the sensor signals generated by array 31 separately from the sensor signals generated by sensors 37. In this arrangement, array 31 provides a conventional forward looking nose-mounted array while the sonar sensors 37 can be utilized in a side viewing mode to achieve a relatively wide ranging low resolution sonar capability.

In operation, the arms typically are retracted for launch and during high speed travel to minimize drag. This "transit/search" mode in which the arms are retracted generally is used during high speed travel and can be employed, for example, for long range target searches. A "classification" mode in which the arms are extended is typically entered after a target is located. The classification mode is used generally during travel at low speeds and can be employed, for example, to precisely locate and/or classify the target.

It is a further feature of the present invention that each of the arms 35 is provided with a generally streamlined cross sectional configuration with the sensors 37 provided in the leading edge thereof. As shown in FIG. 3, such a cross sectional shape of the arms 35,35 provides a fin like configuration which can destabilize the UUV when it is traveling in forward flight.

To further increase the vehicle stability during forward flight when the arms 35,35 are extended, several or all of the projecting arms of FIG. 3 preferably include active control surfaces. The use of active control surfaces has the advantage of providing extra control surface area to improve the control and maneuverability during slow speed operation. That is, the effectiveness of control fins varies approximately with the square of the forward velocity and directly with the surface area. Since the size of control surfaces is very limited for tube launched vehicles, they typically have insufficient control surface area to maneuver at low speeds. However, the disclosed invention provides the opportunity to deploy additional forward control surfaces during low speed.

A further problem is that many tube launched vehicles have a high negative buoyancy and thus must fly at large angles of attack when travelling at low speeds to obtain sufficient lift to overcome the negative buoyancy. The disclosed invention provides the opportunity to orient the extended arms during low speed flight to provide sufficient lift to fly at low speeds with a small or zero angle of attack of the vehicle itself.

Any of several known methods may be used to actuate the control surfaces. For example, the radially projecting arms with the cross sectional configuration suggested above can be made moveable about the individual radial axes, and adjusted by a control unit for purposes of achieving additional controllability of the vehicle. In such case the orientation of each arm would not be restricted to an axial plane, but might instead include the additional capability of rotating each arm 35 about its individual radial axis. Actuators (not shown) would be provided in the vehicle to achieve such motion of the arms 35. Another approach is to use embedded shaped memory alloy actuators (SMA) as disclosed, for example, in U.S. Pat. No. 5,114,104 for this purpose.

The streamlined shape at the forward edge may be constructed as an acoustic window. That is, the material used to construct the leading edge may be acoustically transparent in the surrounding water environment. To provide such an acoustical transparency, the material may have the same value for the product of mass density ($\rho$) and the speed of sound (C) as the surrounding fluid. That is, $\rho C$ for acoustic window material may be equal to $\rho C$ for the surrounding fluid.

In further accordance with the present invention, the nose mounted array includes both transmit and receive capability. As a result, a single wide beam pinger provided in the nose portion can generate signals that will reflect from the object being detected and be received by the sensors in the extended arms on relatively narrow "receive" beams. While it might also be possible to provide some of the arm mounted sensors with wide band hydrophones capable of emitting such wide beam pings the arms themselves are preferably small enough in cross section so as to preclude the additional size and weight required for such pinging or transmittal capability. Preferably, the transmit capability of the sonar system described herein is limited to that provided in the nose mounted sonar array 31. Fixed side mounted pingers might be provided in the cylindrical surface of the underwater vehicle itself to facilitate the side viewing mode when the arms are retracted as described above.

The present invention provides a novel approach for increasing the size and, thus, the resolution of forward looking arrays and offers several advantages over prior art systems. The use of extended arms overcomes the acoustic array size limitation normally imposed by vehicle diameter, thereby providing a high resolution, large diameter forward looking array. The drag penalty normally associated with the use of external arms is minimized by making the arms retractable. The use of retractable arms also provides side looking capability with 360 degree coverage. Additionally, the stability and control problems normally associated with the use of forward-sited external arms is overcome by including control surfaces in the arms.

In light of the above it is therefore understood that within the scope of the appended claims the invention may be practiced otherwise than as specifically described.

What is claimed is:

1. A sonar system for an underwater vehicle defined by a forward nose portion and a generally cylindrical aft section comprising:

more than two arms movably connected to the vehicle, said arms being movable between a stowed position wherein said arms are generally parallel with the aft section and an extended position wherein said arms are generally perpendicular to said aft section;

at least one arm-mounted acoustic sensor mounted on each arm of said more than two arms, said at least one arm-mounted acoustic sensor generating an arm sensor signal in response to acoustic energy incident upon said at least one arm-mounted sensor;

a planar array of acoustic sensors, mounted in said nose portion, for generating an array sensor signal in response to acoustic energy incident upon said array of acoustic sensors; and a sonar signal processor connected to receive said arm sensor signal from said at least one arm-mounted acoustic sensor and to receive said array sensor signal, for processing said arm sensor signal and said array sensor signal, wherein said sonar signal processor processes said arm sensor signal and said array sensor signal as a large diameter planar array when said more than two arms are in an extended position and wherein said sonar signal processor processes said arm sensor signal in a side viewing mode when said more than two arms are in a stowed position.

2. An underwater vehicle comprising:

an elongated body which is generally symmetrical about its longitudinal axis, said body having a forward nose portion and a generally cylindrical section aft of said nose portion, said generally cylindrical section having a plurality of spaced outwardly open axially elongated cavities said nose portion including a sonar array for receiving sonar signals;

arms provided in said cavities, each of said arms having a pivot portion movably connected to said generally cylindrical section and a tip portion opposite said pivot portion, said arms being capable of extended positions wherein said arms define a radial plane generally perpendicular to said axis; and sonar sensors on said arms adjacent the tip portions of said arms whereby said sonar signals are capable of receiving signals from a forward direction when the arms are extended to provide a relatively large diameter sonar receiving array and wherein said sonar sensors provided adjacent the tips of said arms are also operable in a side viewing mode when the arms are provided in said cavities.

3. The vehicle of claim 2 wherein said nose portion includes a second sonar array with transmit capability to provide improved image resolution as a result of said sonar receiving sensors in the tips of the radially projecting arms when provided in said extended positions.

4. The vehicle of claim 2, wherein several of said arms in said extended positions act as control surfaces to stabilize said underwater vehicle.

5. The vehicle according to claim 2, wherein at least one of said arms defines an acoustic window of material selected for equivalent mass and sound velocity as that of the fluid in which the underwater vehicle is operated.

6. An underwater vehicle comprising:

an elongated body which is generally symmetrical about its longitudinal axis, said body having a forward nose portion and a generally cylindrical section aft of said nose portion, said generally cylindrical section having more than two circumaxially spaced outwardly open axially elongated cavities;

arms provided in each of said cavities, each of said arms having a pivot portion movably connected to said generally cylindrical section, and a tip portion opposite said pivot portion, said arms being capable of extended positions wherein said arms define a radial plane generally perpendicular to said longitudinal axis; and sonar sensors adjacent the tip portions of said arms and adapted to receive signals from a forward direction when the arms are extended to provide a non-linear, planar two-dimensional receiving array for such signals.

7. The vehicle according to claim 6, wherein said nose portion includes a non-linear, small area planar array.

8. The vehicle according to claim 6, wherein said nose portion includes a sonar array with transmit capability to provide improved image resolution as a result of said two-dimensional planar sonar receiving sensors in the tip portions of the radially projecting arms when provided in said extended positions.

9. The vehicle according to claim 6 wherein at least one of said arms in said extended positions act as a control surface to stabilize the underwater vehicle.

10. The vehicle according to claim 6, wherein at least one of said arms defines an acoustic window of material selected for equivalent mass and sound velocity as that of the fluid which the underwater vehicle is operating.

* * * * *